United States Patent
Wilson

(10) Patent No.: US 7,840,792 B2
(45) Date of Patent: Nov. 23, 2010

(54) UTILIZING HAND-OFF BLOCKS IN SYSTEM MANAGEMENT MODE TO ALLOW INDEPENDENT INITIALIZATION OF SMBASE BETWEEN PEI AND DXE PHASES

(75) Inventor: Mark Eric Wilson, Tucker, GA (US)

(73) Assignee: American Megatrends, Inc., Norcross, GA (US)

( * ) Notice: Subject to any disclaimer, the term of this patent is extended or adjusted under 35 U.S.C. 154(b) by 766 days.

(21) Appl. No.: 11/789,732

(22) Filed: Apr. 25, 2007

(65) Prior Publication Data

US 2008/0270779 A1    Oct. 30, 2008

(51) Int. Cl.
G06F 15/177    (2006.01)
(52) U.S. Cl. .................... 713/1; 713/2; 713/100
(58) Field of Classification Search ............ 713/1, 713/2, 100
See application file for complete search history.

(56) References Cited

U.S. PATENT DOCUMENTS

| | | | |
|---|---|---|---|
| 5,764,999 A * | 6/1998 | Wilcox et al. ............ 710/261 |
| 5,909,696 A * | 6/1999 | Reinhardt et al. ........... 711/144 |
| 7,093,116 B2 * | 8/2006 | Chen et al. ...................... 713/1 |
| 7,146,512 B2 * | 12/2006 | Rothman et al. ............ 713/310 |
| 7,269,768 B2 * | 9/2007 | Rothman et al. ............ 714/723 |
| 2005/0160159 A1* | 7/2005 | Zimmer et al. .............. 709/223 |
| 2006/0294355 A1* | 12/2006 | Zimmer et al. ................. 713/2 |
| 2007/0055856 A1* | 3/2007 | Zimmer et al. ................. 713/2 |
| 2007/0079295 A1* | 4/2007 | Zimmer et al. .............. 717/136 |
| 2008/0162878 A1* | 7/2008 | Zimmer et al. .............. 712/203 |
| 2008/0196043 A1* | 8/2008 | Feinleib et al. ............. 719/319 |

* cited by examiner

Primary Examiner—Nitin C Patel
(74) Attorney, Agent, or Firm—Aaronson & Waldman, LLC

(57) ABSTRACT

Methods, systems, and computer program products are provided for making PEI phase implementation independent from DXE phase implementation in a computer system implementing the Extensible Firmware Interface standard. For example, one embodiment of the present invention uses a hand-off block to make SMBASE initialization in PEI independent form SMBASE initialization in DXE. In another embodiment of the present invention, PEI phase is entered in order to resume from an S3 standby state.

18 Claims, 5 Drawing Sheets

Exemplary Computer System

UTILIZING HAND-OFF BLOCKS IN SYSTEM MANAGEMENT MODE TO ALLOW INDEPENDENT INITIALIZATION OF SMBASE BETWEEN PEI AND DXE PHASES

BACKGROUND OF THE INVENTION

As understood by one of skill in the art, software is often used as an intermediary between the hardware components of a computing system and the operating system and other high level software executing on the computing system. In some computer systems this intermediate software is known as the computer Basic Input and Output System ("BIOS"). The BIOS provides a set of software routines that allow high level software to interact with the hardware components of the computing system using standard calls.

Because of limitations of the BIOS in many PC-compatible computers, such as the requirement for 16-bit compatibility, a new specification for booting a computer and for communicating between the operating system and the hardware has been proposed. The new specification is called the Extensible Firmware Interface ("EFI"), which was originally developed by INTEL CORPORATION and which is now being developed by the Unified EFI Forum.

The EFI specification describes an interface between the operating system and the system firmware. In particular, the EFI specification defines the interface that platform firmware must implement, and the interface that the operating system may use in booting. EFI also publicizes services used by BIOS firmware, Option ROMs, EFI applications, and the like. How the firmware implements the interface is left up to the manufacturer of the firmware. The EFI specification provides protocols for EFI drivers to communicate with each other, and the core provider functions such as allocation of memory, creating events, setting the clock, and many others. This is accomplished through a formal and complete abstract specification of the software-visible interface presented to the operating system by the platform and the firmware.

Both BIOS and EFI utilize the system management mode ("SMM") provided in microprocessors available from INTEL CORPORATION and AMD CORPORATION. SMM is a special-purpose operating mode for handling system-wide functions like power management, system hardware control, running proprietary code, workarounds for errata, error logging, and platform security. It is intended only for use by system firmware, not by application software or general-purpose system software. The main benefit of SMM is that it offers a distinct and easily isolated processor environment that operates transparently to the operating system and software applications.

When SMM is invoked through a system management interrupt ("SMI"), the central processing unit saves the current state of the processor (the processor's context), then switches to a separate operating environment contained in a special portion of random access memory ("RAM") called the system management RAM ("SMRAM"). While in SMM, the microprocessor executes SMI handler code to perform operations such as powering down unused disk drives or monitors, executing proprietary code, or placing the entire computer in a suspended state. When the SMI handler has completed its operations, it executes a resume ("RSM") instruction. This instruction causes the microprocessor to reload the saved context of the processor, switch back to protected or real mode, and resume executing the interrupted application.

Most system initialization is performed during the Driver Execution Environment ("DXE") phase of EFI. Pre-EFI Initialization ("PEI") executes prior to DXE and initializes platform memory so that the DXE phase can be executed. PEI provides a subset of services similar to EFI. In a computer system that implements EFI, PEI phase can be entered from many phases, such as cold-boot, warm boot, CPU-only reset, power-on, and resume. When a computer system is resuming from an S3 standby state, however, DXE is not entered after PEI. So that the SMM Base ("SMBASE") stays consistent across phases, conventional EFI implementations use the same SMBASE initialization routine for both PEI and DXE. Thus, the PEI and DXE implementations are dependent on each other. Accordingly, there is a need in the art for methods, systems, and computer program products that would enable a PEI implementation to be independent from a DXE implementation.

SUMMARY OF THE INVENTION

One embodiment of the present invention provides methods, systems, and computer program products for using a hand-off block ("HOB") to make SMBASE initialization in PEI independent from SMBASE initialization in DXE. This is accomplished by first entering PEI phase in a computer system, creating a copy of the default SMM handler, determining an initial BSP SMBASE, and storing the initial BSP SMBASE in the HOB. Then, a first SMBASE is determined for a first processor using the initial BSP SMBASE, and the first SMBASE is stored in the HOB.

Next, information about memory to be used during SMM is stored in the HOB. In one embodiment of the present invention, information describing the TSEG (top of memory) region and information describing the memory to be used during the DXE phase of SMM is stored in the HOB. The number of processors is then stored in the HOB, and the default SMM handler is restored using the copy of the default SMM hander. Finally, information stored in the HOB is used to initialize SMM.

In one embodiment of the present invention, the PEI phase is entered in order to resume from a standby state, such as from an S3 standby state. The PEI phase can also be entered from other states, such as cold boot, warm boot, CPU-only reset, or power-on states.

In another embodiment of the present invention, a second SMBASE for a second processor is determined using the initial boot-strap processor ("BSP") SMBASE. The second SMBASE is then stored in the HOB for use during SMM.

In further embodiments of the present invention, a processor from among one or more processors is selected to execute one or more SMM drivers, with the selection performed as a function of the BSP. In other embodiments of the present invention, the HOB comprises a plurality of HOBs. The HOB of any embodiment of the present invention can comprise a GUID extension HOB as understood by one of skill in the art.

Embodiments of the present invention can be implemented using a high-level language such as the C programming language, and may be supplemented by assembly code, when necessary.

Unless otherwise expressly stated, it is in no way intended that any method or embodiment set forth herein be construed as requiring that its steps be performed in a specific order. Accordingly, where a method, system, or computer program product claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification.

BRIEF DESCRIPTION OF THE DRAWINGS

The foregoing and other advantages and features of the invention will become more apparent from the detailed description of exemplary embodiments of the invention given below with reference to the accompanying drawings.

In the following detailed description, reference is made to the accompanying drawings, which form a part hereof, and in which is shown by way of illustration of specific embodiments in which the invention may be practiced. These embodiments are described in sufficient detail to enable those skilled in the art to practice the invention, and it is to be understood that other embodiments may be utilized, and that structural, logical and programming changes may be made without departing from the spirit and scope of the present invention.

DETAILED DESCRIPTION OF THE INVENTION

Before the present methods, systems, and computer program products are disclosed and described, it is to be understood that this invention is not limited to specific methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Thus, for example, reference to "an encoder" includes mixtures of encoders, reference to "an encoder" includes mixtures of two or more such encoders, and the like.

Figure 1:
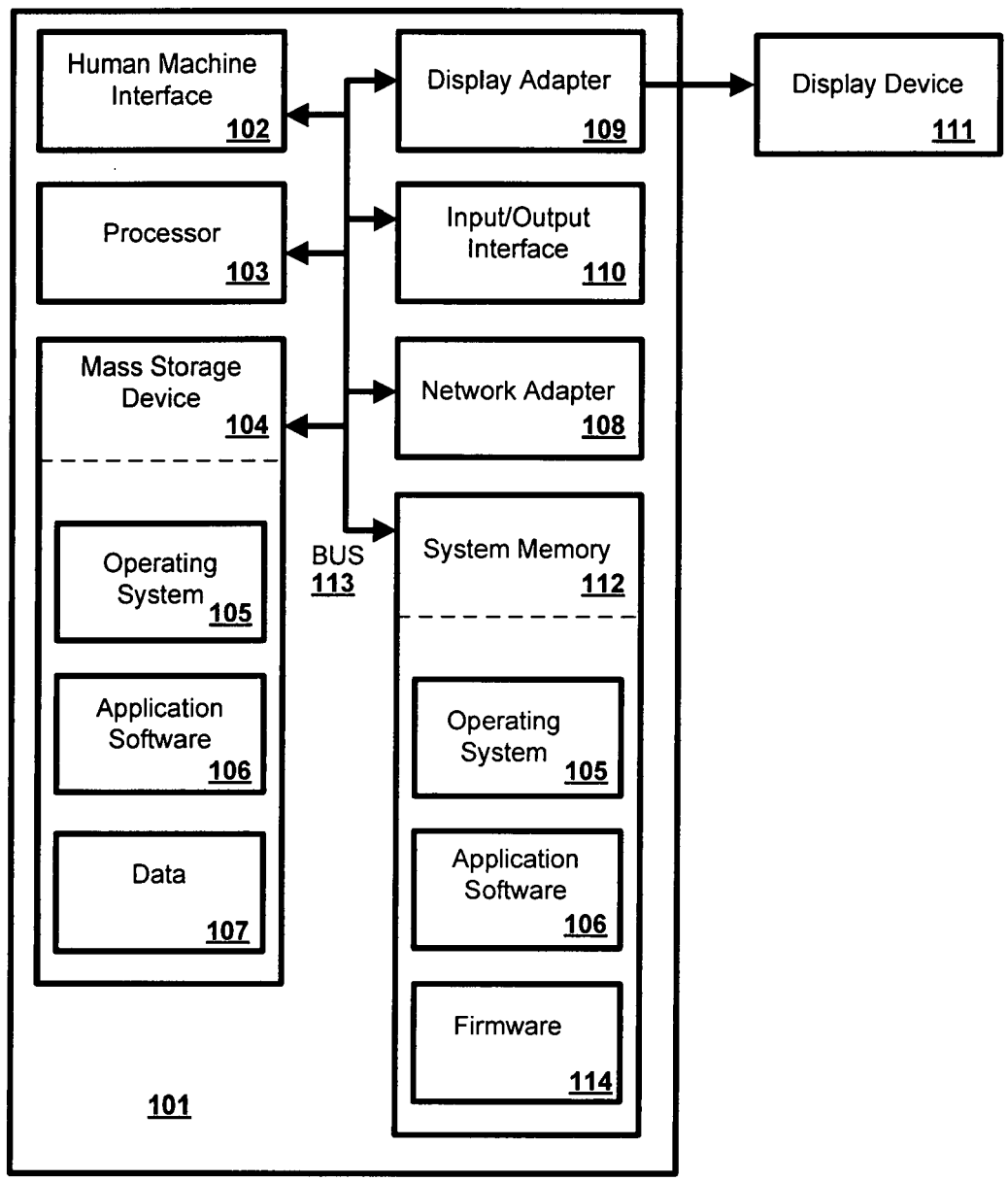
FIG. 1 shows a logical overview of a computer system which can be used to carry out various embodiments of the present invention.

The present invention can be carried out using a processor programmed to carry out the various embodiments of the present invention. FIG. 1 is a block diagram illustrating an exemplary computer system for performing the various embodiments. This exemplary system is only an example of an operating environment and is not intended to suggest any limitation as to the scope of use or functionality of operating environment architectures useable with the present invention. Neither should the operating environment be interpreted as having any dependency or requirement relating to any one or combination of components illustrated in the computer system.

The embodiments of the present invention can be operational with numerous general purpose or special purpose computing system environments or configurations. Examples of well known computing systems, environments, and/or configurations that may be suitable for use with embodiments of the present invention include, but are not limited to, personal computers, server computers, laptop devices, and multiprocessor systems. Additional examples include set top boxes, programmable consumer electronics, network PCs, minicomputers, mainframe computers, distributed computing environments that include any of the above systems or devices, and the like.

The embodiments may be described in the general context of computer instructions, such as program modules, being executed by a computer. Generally, program modules include routines, programs, objects, components, data structures, etc. that perform particular tasks or implement particular abstract data types. The method may also be practiced in distributed computing environments where tasks are performed by remote processing devices that are linked through a communications network. In a distributed computing environment, program modules may be located in both local and remote computer storage media including memory storage devices.

The embodiments disclosed herein can be implemented via a general-purpose computing device in the form of a computer 101. The components of the computer 101 can include, but are not limited to, one or more processors or processing units 103, a system memory 112, and a system bus 113 that couples various system components including the processor 103 to the system memory 112.

The processor 103 in FIG. 1 can be an x-86 compatible processor, including a PENTIUM IV, manufactured by Intel Corporation, or an ATHLON 64 processor, manufactured by Advanced Micro Devices Corporation. Processors utilizing other instruction sets may also be used, including those manufactured by Apple, IBM, or NEC.

The system bus 113 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection. The bus 113, and all buses specified in this description can also be implemented over a wired or wireless network connection and each of the subsystems, including the processor 103, a mass storage device 104, an operating system 105, application software 106, data 107, a network adapter 108, system memory 112, an Input/Output Interface 110, a display adapter 109, a display device 111, and a human machine interface 102, can be contained within one or more remote computing devices at physically separate locations, connected through buses of this form, in effect implementing a fully distributed system.

The operating system 105 in FIG. 1 includes operating systems such as MICROSOFT WINDOWS XP, WINDOWS SERVER 2003, WINDOWS VISTA, and REDHAT LINUX, FREE BSD, or SUN MICROSYSTEMS SOLARIS. Additionally, the application software 106 may include web browsing software, such as MICROSOFT INTERNET EXPLORER or MOZILLA FIREFOX, enabling a user to view HTML, SGML, XML, or any other suitably constructed document language on the display device 111.

The computer 101 typically includes a variety of computer readable media. Such media can be any available media that is accessible by the computer 101 and includes both volatile and non-volatile media, removable and non-removable media. The system memory 112 includes computer readable media in the form of volatile memory, such as random access memory (RAM), and/or non-volatile memory, such as read only memory (ROM). The system memory 112 typically contains data such as data 107 and and/or program modules such as operating system 105 and application software 106 that are immediately accessible to and/or are presently operated on by the processing unit 103. The computer 101 can also include a firmware 114 that can be located in system memory 112 on volatile or non-volatile memory, or on any other suitable computer readable medium.

The computer 101 may also include other removable/non-removable, volatile/non-volatile computer storage media. By way of example, FIG. 1 illustrates a mass storage device 104 which can provide non-volatile storage of computer code, computer readable instructions, data structures, firmware images, program modules, and other data for the computer 101. For example, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 104, including by way of example, an operating system 105 and application software 106. Each of the operating system 105 and application software 106 (or some combination thereof) may include elements of the programming and the application software 106. Data 107 can also be stored on the mass storage device 104. Data 104 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems.

A user can enter commands and information into the computer 101 via an input device (not shown). Examples of such input devices include, but are not limited to, a keyboard, pointing device (e.g., a "mouse"), a microphone, a joystick, a serial port, a scanner, and the like. These and other input devices can be connected to the processing unit 103 via a human machine interface 102 that is coupled to the system bus 113, but may be connected by other interface and bus structures, such as a parallel port, serial port, game port, or a universal serial bus (USB).

A display device 111 can also be connected to the system bus 113 via an interface, such as a display adapter 109. For example, a display device can be a cathode ray tube (CRT) monitor or a Liquid Crystal Display (LCD). In addition to the display device 111, other output peripheral devices can include components such as speakers (not shown) and a printer (not shown) which can be connected to the computer 101 via Input/Output Interface 110.

The computer 101 can operate in a networked environment using logical connections to one or more remote computing devices. By way of example, a remote computing device can be a personal computer, portable computer, a server, a router, a network computer, a peer device or other common network node, and so on. Logical connections between the computer 101 and a remote computing device can be made via a local area network (LAN) and a general wide area network (WAN). Such network connections can be through a network adapter 108. A network adapter 108 can be implemented in both wired and wireless environments. Such networking environments are commonplace in offices, enterprise-wide computer networks, intranets, and the Internet.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of application software 106 may be stored on or transmitted across some form of computer readable media. An implementation of the disclosed methods may also be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

As known to known to one of skill in the art, processors such as processor 103 support SMM, which provides an operating environment that can be used to manage system resources for power control, hardware control, or to run proprietary software. SMM is a mode of operation that is distinct from operation of the Driver Execution Environment ("DXE") and the Pre-EFI ("PEI") phases of EFI. SMM is transparent to the operating system 105. Further description of SMM is described in the Intel Platform Innovation Framework for EFI System Management Mode Core Interface Specification, which is herein incorporated by reference.

When SMM is invoked through a system management interrupt ("SMI"), the processor 103 saves the current state of the processor 103 (the processor's context), then switches to a separate operating environment contained in a special portion of the system memory 112 called the system management RAM ("SMRAM"). While in SMM, the processor 103 executes SMI handler code to perform operations such as powering down components, executing proprietary code, placing the computer system 101 in a suspended state, error logging, and platform security. When the SMI handler has completed its operations, it executes a resume ("RSM") instruction. This instruction causes the processor 103 to reload the saved context of the processor 103, switch back to protected or real mode, and resume executing the interrupted application or operating-system program or task.

Execution of the SMM computing mode is transparent to software executing on the computing system 101. SMM is transparent because the processor 103 executes SMM code in a separate address space ("SMRAM") that can be made inaccessible from the other operating modes. Further, the processor 103 saves the context of the interrupted program upon entering SMM and then restores that context once SMM is exited.

While in SMM the processor 103 executes code and stores data in the SMRAM address space. The SMRAM is mapped to the physical address space of the processor 103 and can be up to 4 GB in size. The processor 103 uses this space to save the context of the processor 103 and to store the SMI handler code, data, and stack. The SMRAM can also be used to store system management information and OEM-specific information. The default SMRAM size is determined by the chip set utilized. The default SMRAM is located at a base physical address in physical memory called the SMBASE. The SMBASE is typically set to the beginning of SMRAM. When a SMI occurs, the processor 103 switches to SMM, saves the processor 103 context to addresses relative to the SMBASE and begins execution at SMBASE+8000h. For an Intel processor, the SMBASE can be in TSEG, with an initial entry point of 3000h. AMD processors, however, may start in ASEG or BSEG. Accordingly, one of skill in the art will understand that the embodiments of the present invention can use processors from any manufacturer.

EFI is designed to replace the conventional BIOS interface that was historically used by IBM PC compatible computers. An EFI implementation comprises a firmware image that can be loaded from almost any storage device attached to a computer. Thus, a system can have an EFI partition on a hard drive that can add functions to an EFI firmware stored on a ROM. As a replacement for legacy BIOSs, EFI includes all the steps needed to initialize a computer system after power-on. EFI can also support a legacy PC BIOS through a compatibility support module.

Figure 2:
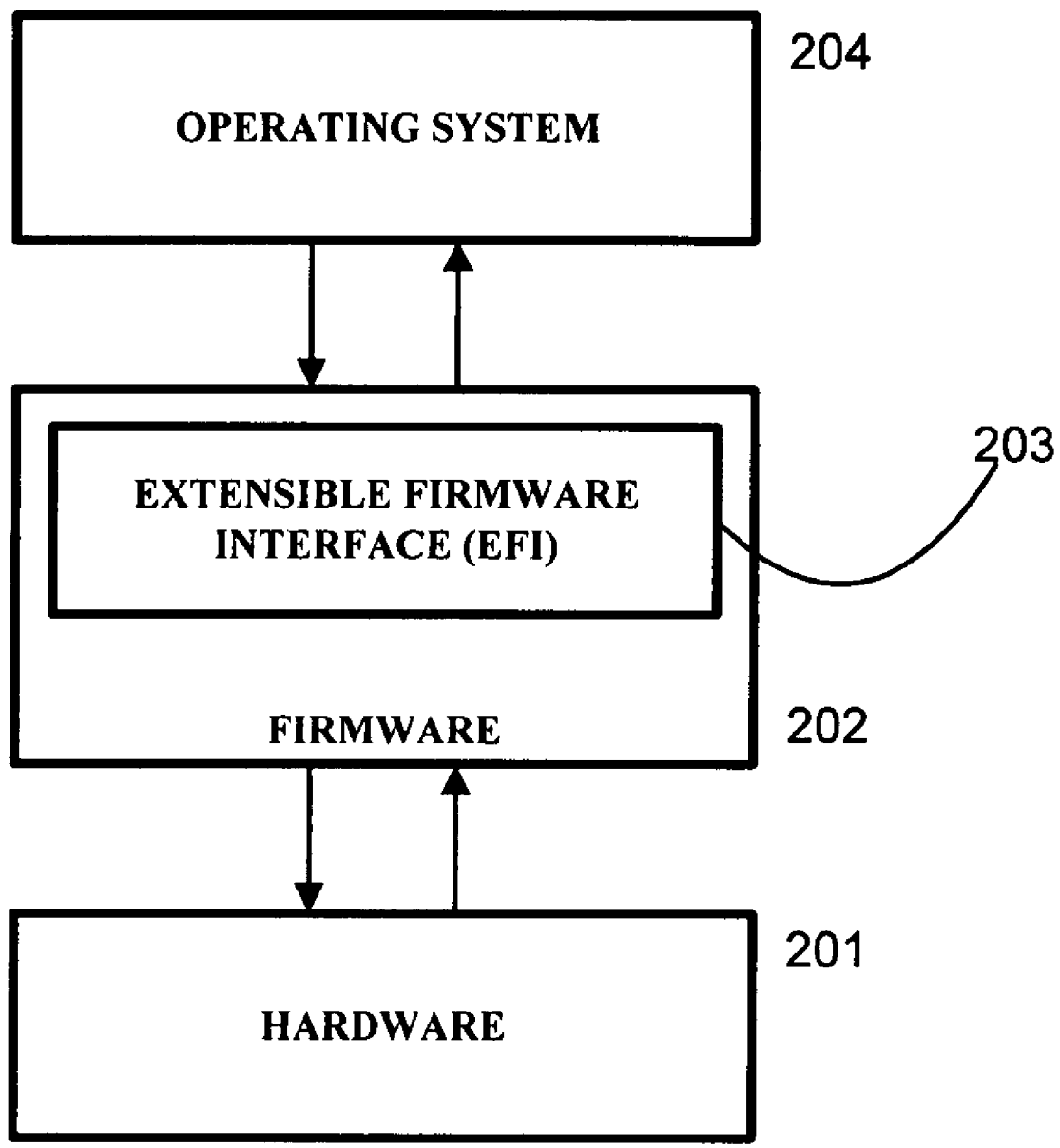
FIG. 2 shows how an Extensible Firmware Interface logically interacts with a computer system.

FIG. 2 shows how an Extensible Firmware Interface 203 implemented within a system firmware 202 logically interacts with a computer system, such as with the computer system 101 of FIG. 1. Specifically, it can be seen that an EFI implementation 203 acts an interface between the hardware 201 and the operating system 204 of a computer system 101. The firmware 202 can be stored in any suitable type of memory, such as system memory 112, including volatile and non-volatile memory devices.

Figure 3:
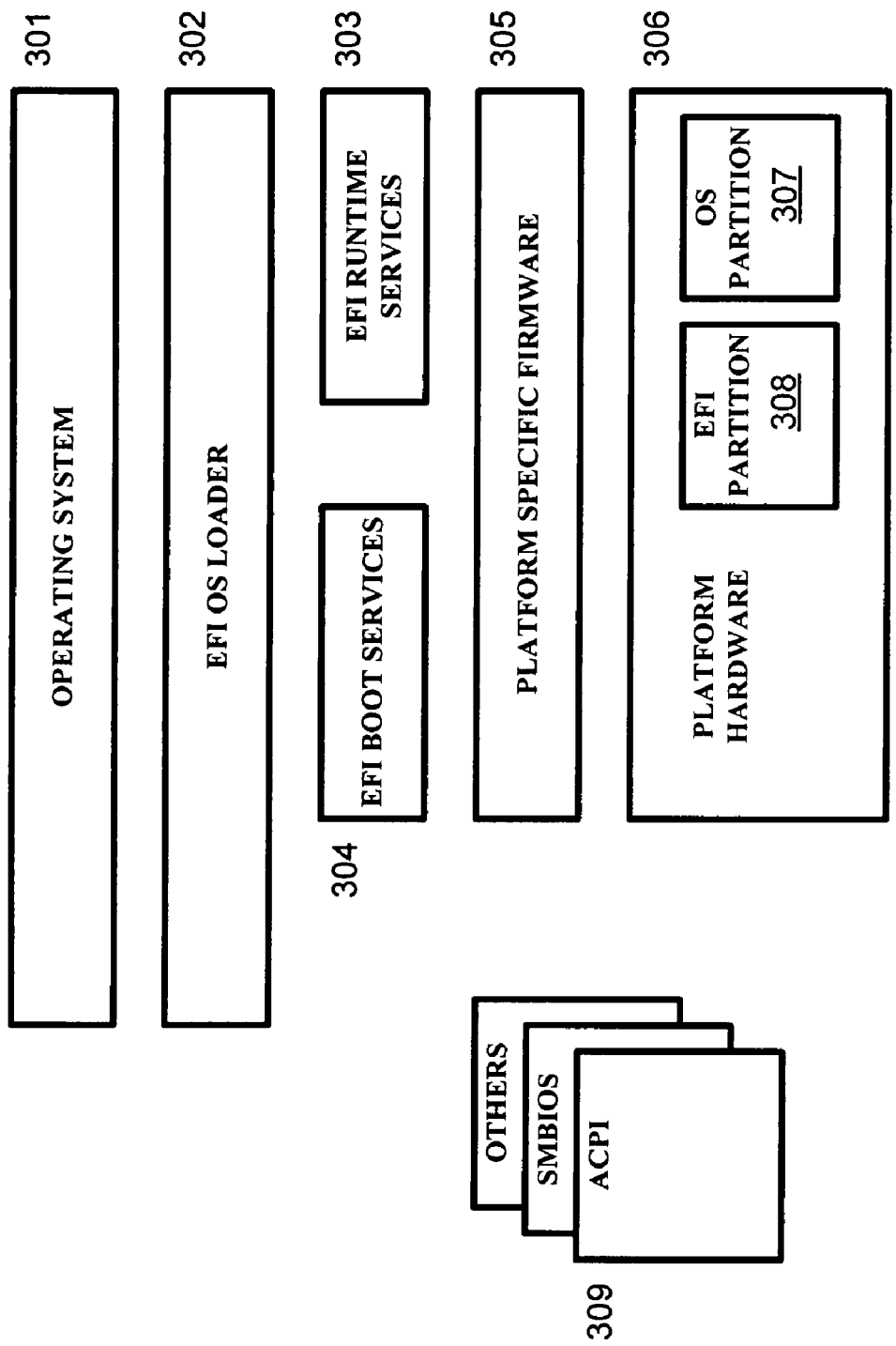
FIG. 3 is a logical system diagram showing an Extensible Firmware Interface implementation in relation to other computer system components.

FIG. 3 shows one implementation of an EFI compatible computer system, such as the computer system 101 of FIG. 1. As shown in FIG. 3, the system includes platform hardware 306 and an operating system 301. The platform firmware 305 may retrieve an OS image from the EFI system partition 308 using an EFI OS loader 302. The EFI system partition 308 can be an architecturally shareable system partition. As such, the EFI system partition 308 defines a partition and file system that are designed to allow safe sharing of mass storage between multiple vendors. An OS partition 307 may also be utilized.

Once started, the EFI OS loader 302 continues to boot the complete operating system 301. In doing so, the EFI OS loader 302 may use EFI boot services 304 and interface to other supported specifications to survey, comprehend, and initialize the various platform components and the operating system software that manages them. Thus, interfaces 309 from other specifications may also be present on the system. For example, the Advanced Configuration and Power Management Interface ("ACPI") and the System Management BIOS ("SMBIOS") specifications may be supported.

EFI boot services 304 provide interfaces for devices and system functionality that can be used during boot time. EFI runtime services 303 may also be available to the OS loader 302 during the boot phase. For example, a minimal set of runtime services may be presented to ensure appropriate abstraction of base platform hardware resources that may be needed by the operating system 301 during its normal operation. EFI allows extension of platform firmware by loading EFI driver and EFI application images which, when loaded, have access to all EFI-defined runtime and boot services.

In order to provide memory management services to processes executing in conjunction with EFI within the SMM, the platform specific firmware 305 may provide an SMM memory manager application program that executes within SMM. The SMM memory manager application may be called to allocate and deallocate pages of memory within the SMRAM.

Most system initialization of a system implementing EFI is performed during the Driver Execution Environment ("DXE") phase. Pre-EFI Initialization ("PEI") executes prior to DXE and initializes platform memory so that the DXE phase can be executed. Information is passed from the PEI phase to the DXE phase through a list of data structures called Hand-Off Blocks ("HOB"). The DXE phase ends when an operating system is booted. HOBs are allocated sequentially in memory, and are read-only in the DXE phase. HOBs are described in the Intel Platform Innovation Framework for EFI Hand-Off Block (HOB) Specification, which is herein incorporated by reference.

In a computer system that implements EFI, PEI phase can be entered from many phases, such as cold-boot, warm boot, CPU-only reset, power-on, and resume. However, when a computer system is resuming from an S3 standby state, as understood by one of skill in the art, DXE is not entered after PEI. So that the SMBASE stays consistent across phases, conventional EFI implementations use the same SMBASE initialization code for both PEI and DXE. Embodiments of the present invention remedy this problem by enabling SMBASE initialization in PEI to be independent from SMBASE initialization in DXE. Additional information about PEI can be found in the Intel Platform Innovation Framework for EFI Pre-EFI Initialization Core Specification, which is herein incorporated by reference. Further information about DXE can be found in the Driver Execution Environment Core Interface Specification, also published by INTEL CORPORATION and herein incorporated by reference.

Accordingly, one embodiment of the present invention provides methods, systems, and computer program products that enable SMBASE initialization in PEI to be independent from SMBASE initialization in DXE by using a HOB to store selected information. One such embodiment is shown in FIG. 4.

Figure 4:
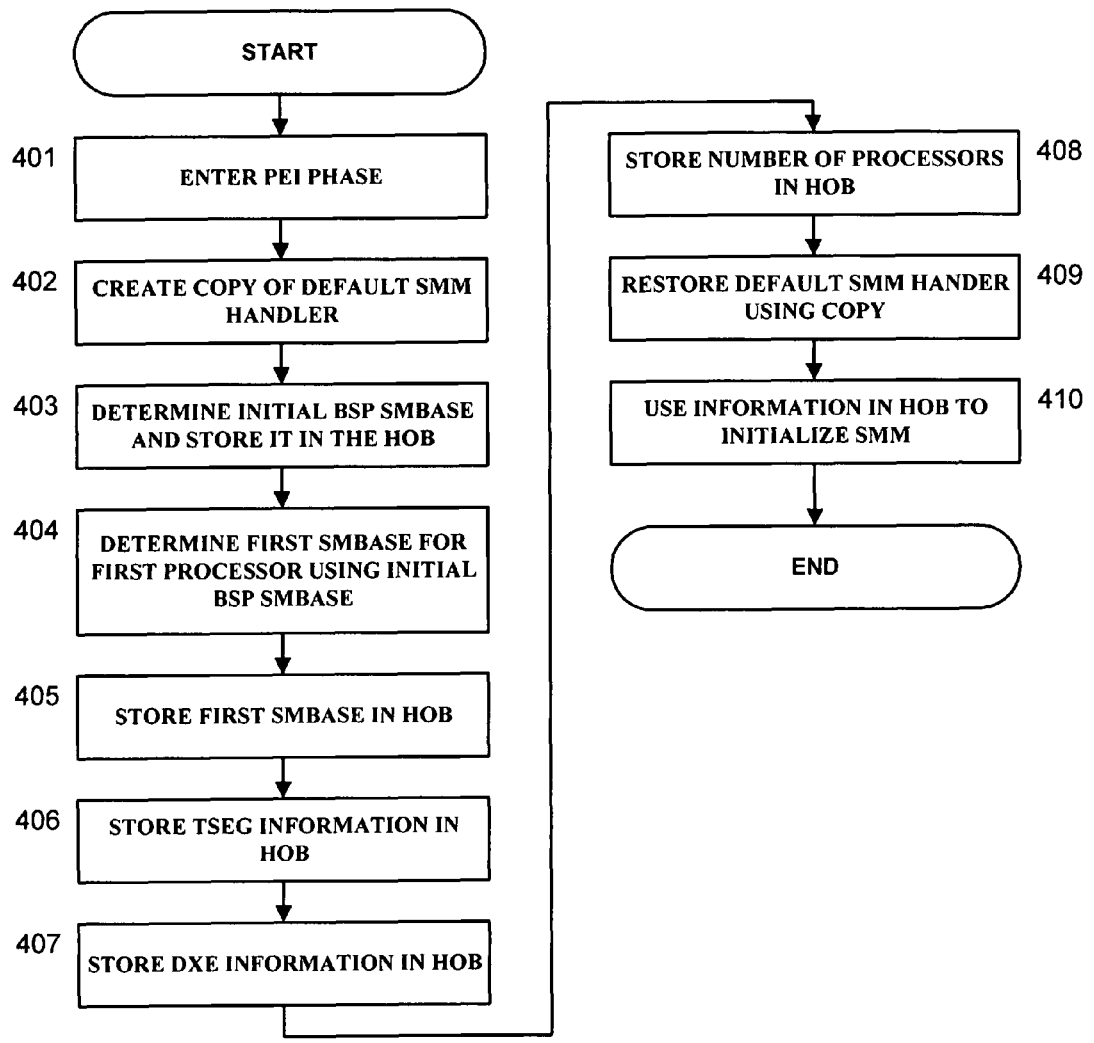
FIG. 4 is a flow diagram showing one embodiment of the present invention for using a HOB to make SMBASE initialization in PEI independent from SMBASE initialization in DXE.

First in the embodiment of FIG. 4, PEI phase is entered 401, and second, a copy of the default SMM handler is created 402. Third, an initial BSP SMBASE is determined 403 and stored in the HOB. A first SMBASE for a first processor is then determined 404 using the initial BSP SMBASE, and the first SMBASE is stored in the HOB 405.

Next in the embodiment of FIG. 4, information about memory is stored in the HOB. Specifically, TSEG information that describes the TSEG region is stored 406 in the HOB. DXE information that describes the memory to be used during SMM is also stored 407 in the HOB. The number of processors is also stored 408 in the HOB. As one of skill in the art will appreciate, any additional information useful for initializing SMM can also be stored in the HOB.

Further, in the current embodiment, the default SMM handler is restored 409 using the copy of the SMM handler. Finally, information in the HOB is used to initialize 410 SMM. Thus, as understood by one of skill in the art, the embodiment of FIG. 4 decouples a PEI implementation from a DXE implementation by using a HOB to pass information from a PEI phase to a DXE phase, enabling SMBASE initialization in both phases to be independent.

In one embodiment extending the embodiment of FIG. 4, PEI phase is entered in order to resume from an S3 standby state. One of skill in the art will understand that PEI phase can be entered from other states in various embodiments of the present invention, such as from a cold boot, warm boot, CPU-only reset, or power-on state.

Figure 5:
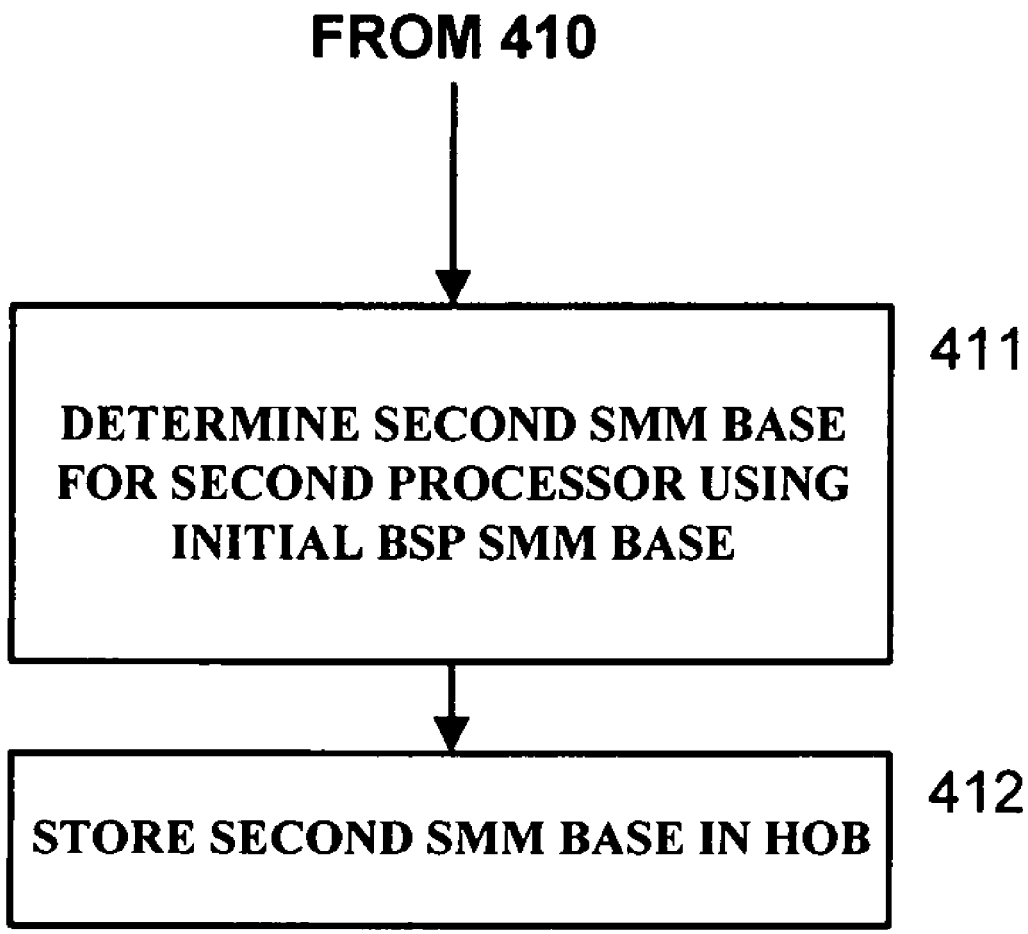
FIG. 5 is a flow diagram showing another embodiment of the present invention for using a HOB to make SMBASE initialization in PEI independent from SMBASE initialization in DXE.

In a further embodiment extending the embodiment of FIG. 4, and as depicted in FIG. 5, a second SMBASE is determined 411 for a second processor using the initial BSP SMBASE. The second SMBASE is then stored 412 in the HOB for use during SMM. One of skill in the art will realize that the embodiment of FIG. 5 can be used with any embodiment of the present invention.

In another embodiment of the present invention extending the embodiment of FIG. 4, a processor is selected to execute one or more SMM drivers using the BSP. For example, the processor selected to execute SMM drivers can be the BSP in embodiments of the present invention.

The HOB can comprise a plurality of HOBs in various embodiments of the present invention. For example, one HOB could be used to store the initial SMBASE, and another HOB could be used to store TSEG information describing the TSEG region. In further embodiments of the present invention, the HOB can be a GUID extension HOB as understood by one of skill in the art.

One of skill in the art will understand that the aforementioned methods may be embodied in a computer program product encoded to perform the methods of the present invention. Similarly, the aforementioned methods can be claimed as one or more systems comprising processors, memories, and data structures.

While the invention has been described in detail in connection with exemplary embodiments, it should be understood that the invention is not limited to the above-disclosed embodiments. Rather, the invention can be modified to incorporate any number of variations, alternations, substitutions, or equivalent arrangements not heretofore described, but which are commensurate with the spirit and scope of the invention. Specific embodiments should be taken as exemplary and not limiting. For example, the present invention may be used in a web-based application. Accordingly, the invention is not limited by the foregoing description or drawings, but is only limited by the scope of the appended claims.

I claim:

1. A computer-implemented method for using a hand-off block ("HOB") in a system management mode ("SMM") to make SMM base ("SMBASE") initialization in a pre-EFI initialization ("PEI") phase independent from SMBASE initialization in a driver execution environment ("DXE") phase, the method comprising executing instructions on a general-purpose computing device programmed to perform the steps of:
    entering the PEI phase;
    creating a copy of a default SMM handler;
    determining an initial boot-strap processor ("BSP") SMBASE and storing it in the HOB;
    determining a first SMBASE for a first processor using the initial BSP SMBASE;
    storing the first SMBASE in the HOB;
    storing DXE information that describes the memory to be used during the DXE phase of SMM in the HOB;
    storing the number of processors in the HOB;
    restoring the default SMM handler using the copy of the default SMM handler; and
    using information in the HOB to initialize SMM.

2. The method of claim 1, wherein entering the PEI phase comprises entering the PEI phase in order to resume from an S3 standby state.

3. The method of claim 1, wherein entering the PEI phase comprises entering the PEI phase from at least one of a cold boot, warm boot, CPU-only reset, or power-on state.

4. The method of claim 1, further comprising the steps of:
    determining a second SMBASE for a second processor using the initial BSP SMBASE; and
    storing the second SMBASE in the HOB.

5. The method of claim 4, further comprising the step of selecting a processor to execute one or more SMM drivers using the BSP.

6. The method of claim 1, wherein the HOB comprises a plurality of HOBs.

7. A system for using a hand-off block ("HOB") in a system management mode ("SMM") to make SMM base ("SMBASE") initialization in a pre-EFI initialization ("PEI") phase independent from SMBASE initialization in a driver execution environment ("DXE") phase, comprising:
    means for entering the PEI phase;
    means for creating a copy of a default SMM handler;
    means for determining an initial boot-strap processor ("BSP") SMBASE and storing it in the HOB;
    means for determining a first SMBASE for a first processor using the initial BSP SMBASE;
    means for storing the first SMBASE in the HOB;
    means for storing DXE information that describes the memory to be used during the DXE phase of SMM in the HOB;
    means for storing the number of processors in the HOB;
    means for restoring the default SMM handler using the copy of the default SMM handler; and
    means for using information in the HOB to initialize SMM.

8. The system of claim 7, wherein entering the PEI phase comprises entering the PEI phase in order to resume from an S3 standby state.

9. The system of claim 7, wherein entering the PEI phase comprises entering the PEI phase from at least one of a cold boot, warm boot, CPU-only reset, or power-on state.

10. The system of claim 7, further comprising:
    a means for determining a second SMBASE for a second processor using the initial BSP SMBASE; and
    a means for storing the second SMBASE in the HOB.

11. The system of claim 10, further comprising a means for selecting a processor to execute one or more SMM drivers using the BSP.

12. The system of claim 7, wherein the HOB comprises a plurality of HOBs.

13. A non-transitory computer storage medium encoded with computer-readable instructions for using a hand-off block ("HOB") in a system management mode ("SMM") of a computer to make SMM base ("SMBASE") initialization in a pre-EFI initialization ("PEI") phase independent from SMBASE initialization in a driver execution environment ("DXE") phase, wherein the computer-readable instructions cause a computer to perform the steps of:
    entering the PEI phase;
    creating a copy of a default SMM handler;
    determining an initial boot-strap processor ("BSP") SMBASE and storing it in the HOB;
    determining a first SMBASE for a first processor using the initial BSP SMBASE;
    storing the first SMBASE in the HOB;
    storing DXE information that describes the memory to be used during the DXE phase of SMM in the HOB;
    storing the number of processors in the HOB;
    restoring the default SMM handler using the copy of the default SMM handler; and
    using information in the HOB to initialize SMM.

14. The computer storage medium of claim 13, wherein entering the PEI phase comprises entering the PEI phase in order to resume from an S3 standby state.

15. The computer storage medium of claim 13, wherein entering the PEI phase comprises entering the PEI phase from at least one of a cold boot, warm boot, CPU-only reset, or power-on state.

16. The computer storage medium of claim 13, encoded with further computer-readable instructions that cause the computer to perform the steps of:

determining a second SMBASE for a second processor using the initial BSP SMBASE; and storing the second SMBASE in the HOB.

17. The computer storage medium of claim 16, encoded with further computer-readable instructions that cause the computer to perform the step of selecting a processor to execute one or more SMM drivers using the BSP.

18. The computer storage medium of claim 13, wherein the HOB comprises a plurality of HOBs.

* * * * *